United States Patent
Deering et al.

(10) Patent No.: US 9,569,752 B2
(45) Date of Patent: Feb. 14, 2017

(54) PROVIDING PARAMETERIZED ACTIONABLE COMMUNICATION MESSAGES VIA AN ELECTRONIC COMMUNICATION

(75) Inventors: Christopher Deering, Galway (IE); Qian Zhang, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 387 days.

(21) Appl. No.: 13/435,212

(22) Filed: Mar. 30, 2012

(65) Prior Publication Data

US 2013/0159432 A1    Jun. 20, 2013

Related U.S. Application Data

(60) Provisional application No. 61/576,078, filed on Dec. 15, 2011.

(51) Int. Cl.
G06F 15/16   (2006.01)
G06Q 10/10   (2012.01)
H04L 12/58   (2006.01)

(52) U.S. Cl.
CPC ........... G06Q 10/107 (2013.01); H04L 12/581 (2013.01)

(58) Field of Classification Search
USPC .................. 709/204, 206; 715/700–866; 348/14.01–14.04
See application file for complete search history.

(56) References Cited

U.S. PATENT DOCUMENTS

| | | | |
|---|---|---|---|
| 7,478,129 B1 * | 1/2009 | Chemtob | 709/204 |
| 7,921,013 B1 | 4/2011 | Ostermann et al. | |
| 7,949,109 B2 | 5/2011 | Ostermann et al. | |
| 8,181,115 B2 * | 5/2012 | Irving | 715/753 |
| 8,405,702 B1 * | 3/2013 | Gottlieb | 348/14.08 |
| 2002/0118809 A1 * | 8/2002 | Eisenberg | 379/202.01 |
| 2004/0162877 A1 * | 8/2004 | Van Dok | G06F 3/0481 709/204 |
| 2004/0215731 A1 * | 10/2004 | Tzann-en Szeto | 709/207 |
| 2005/0223073 A1 * | 10/2005 | Malik | 709/206 |
| 2009/0215479 A1 * | 8/2009 | Karmarkar | H04L 12/5895 455/466 |
| 2010/0179991 A1 * | 7/2010 | Lorch et al. | 709/206 |
| 2010/0315482 A1 * | 12/2010 | Rosenfeld et al. | 348/14.08 |
| 2011/0249073 A1 * | 10/2011 | Cranfill et al. | 348/14.02 |

* cited by examiner

*Primary Examiner* — Mohamed Wasel
*Assistant Examiner* — Tsung Wu
(74) *Attorney, Agent, or Firm* — Edell, Shapiro & Finnan, LLC

(57) ABSTRACT

A method, an apparatus and computer readable storage media facilitate initiating an actionable message at a computing device in response to input of a defined sequence of characters at the computing device, and executing an action associated with the initiated actionable message in accordance with information that is specific to the actionable message.

14 Claims, 7 Drawing Sheets

PROVIDING PARAMETERIZED ACTIONABLE COMMUNICATION MESSAGES VIA AN ELECTRONIC COMMUNICATION

CROSS REFERENCE TO RELATED APPLICATIONS

This application claims priority from U.S. Provisional Application 61/576,078, entitled "Sending Parameterized, Actionable Communicons Via Instant Messaging or Other Communication Sessions", and filed Dec. 15, 2011, the disclosure of which is incorporated herein by reference in its entirety.

TECHNICAL FIELD

The present disclosure relates to providing forms of communication within communications sessions, such as instant messaging, email and other forms of text based electronic communications.

BACKGROUND

In an ongoing electronic communication session, such as an instant message conversation, users can sometimes receive a chat message which requires them to take a certain action to change the electronic communication to some other form. For example, chat messages such as "Can you set up a web meeting to discuss this?" or "Let's have a conference call" requires at least one user/participant to establish the other form of communication (web meeting or conference call). This often requires an intuitive and convenient mechanism for escalating a conversation from a purely textual communication to other more rich forms of communication, such as voice, video or conference calls, web meetings, group-chats and/or desktop-shares.

The process of changing from one text based electronic communication format, such as instant messaging, to another typically involves a number of tedious, manual and potentially error-prone user steps, including: (1) leaving the instant message (or other) graphical user interface to create and configure the new form of communication (e.g., manually dialing numbers, setting up conference calls, creating group chats or web-meetings, etc.); and (2) communicating the newly established communication link to other users (e.g., forwarding a phone number, URL or other token to the intended participants, such as the participants of the originating communication session) so that all participants may join in the extended conversation. The result of these obstacles is that users are impeded in quickly and fluidly adding different modes of communication as the conversation evolves, even when those different communication mediums are integrated into one application. By lacking a simple and intuitive means of escalation, the overall usage of the richer communication mediums is reduced as users are more inclined to make do with the existing method of communication (e.g., staying with an instant message conversation) since the barrier to escalation and the effort required to switch to the more enriched or enhanced form of communication is too burdensome.

DESCRIPTION OF EXAMPLE EMBODIMENTS

Overview

A method, an apparatus and computer readable storage media facilitate initiating an actionable message at a computing device in response to input of a defined sequence of characters at the computing device, and executing an action associated with the initiated actionable message in accordance with the information that is specific to the actionable message.

Example Embodiments

Figure 1:
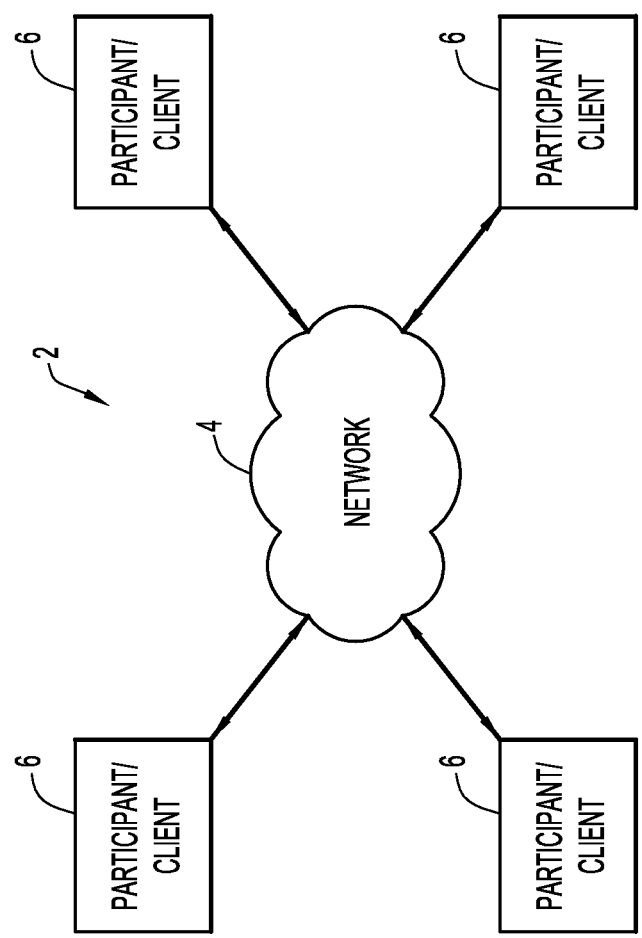
FIG. 1 is a schematic block diagram of an example system in which participant/client devices are connected via a network to facilitate communications between the participant/client devices during a communication session.

Referring to FIG. 1, a block diagram is shown for an example system that facilitates transfer of an electronic communications between two or more users or participants, where each participant includes a computing device and communicates with other participants over a communication network. In particular, FIG. 1 depicts an example system 2 in which a plurality of participant/computing devices in the form of client devices 6 are connected with each other via a network 4. The system network 4 can include one or more servers that provide access or a communication link between the client devices 6 in order to facilitate communication between two or more client devices 6 via one or more different types of communication including, without limitation, email communications, instant message communications, audio and/or video conference (e.g., telephone calls, video conferencing, webcast, etc.) communications and/or other forms of communications. While four client devices 6 are shown in the system 2, this is for illustrative purposes only and it is noted that the system 2 can include any number of client devices 6 (e.g., hundreds, thousands or even a larger number of client devices). In addition, while the embodiments depicted in the figures describe a client/server relationship, it is noted that this architecture or configuration is provided for example purposes only and the present invention is not limited to such architecture but instead is also readily applicable to other system architectures that support communications directly between two or more computing devices (e.g., P2P architectures and/or any other suitable architectures in which computing devices communicate directly with each other with no requirement of an intermediary server). In embodiments in which computing devices communicate directly with each other, the functions of the server (as described herein) are implemented instead by one or more of the directly communicating computing devices.

Examples of types of networks that can be utilized within system 2 include, without limitation, local or wide area networks, Internet Protocol (IP) networks such as intranet or internet networks, telephone networks (e.g., public switched telephone networks), wireless or mobile phone or cellular networks, and any suitable combinations thereof. Each client device 6 can operate via any suitable wireless or hard wired connection to the servers of the network 4. For example, each client device 6 can include a suitable network interface unit, such as an Ethernet interface card or switch, a modem, a router or any other suitable hardware device that facilitates a wireless and/or hardwire connection over the communication network 4 with other client devices 6 (e.g., via one or more servers of the network 4), where the network interface unit can be integrated within the device or a peripheral that connects with the device. The servers of the network 4 also can include similar network interface units to enable communication with client devices 6 and connecting two or more client devices 6 for one or more different types of communication sessions.

Figure 2:
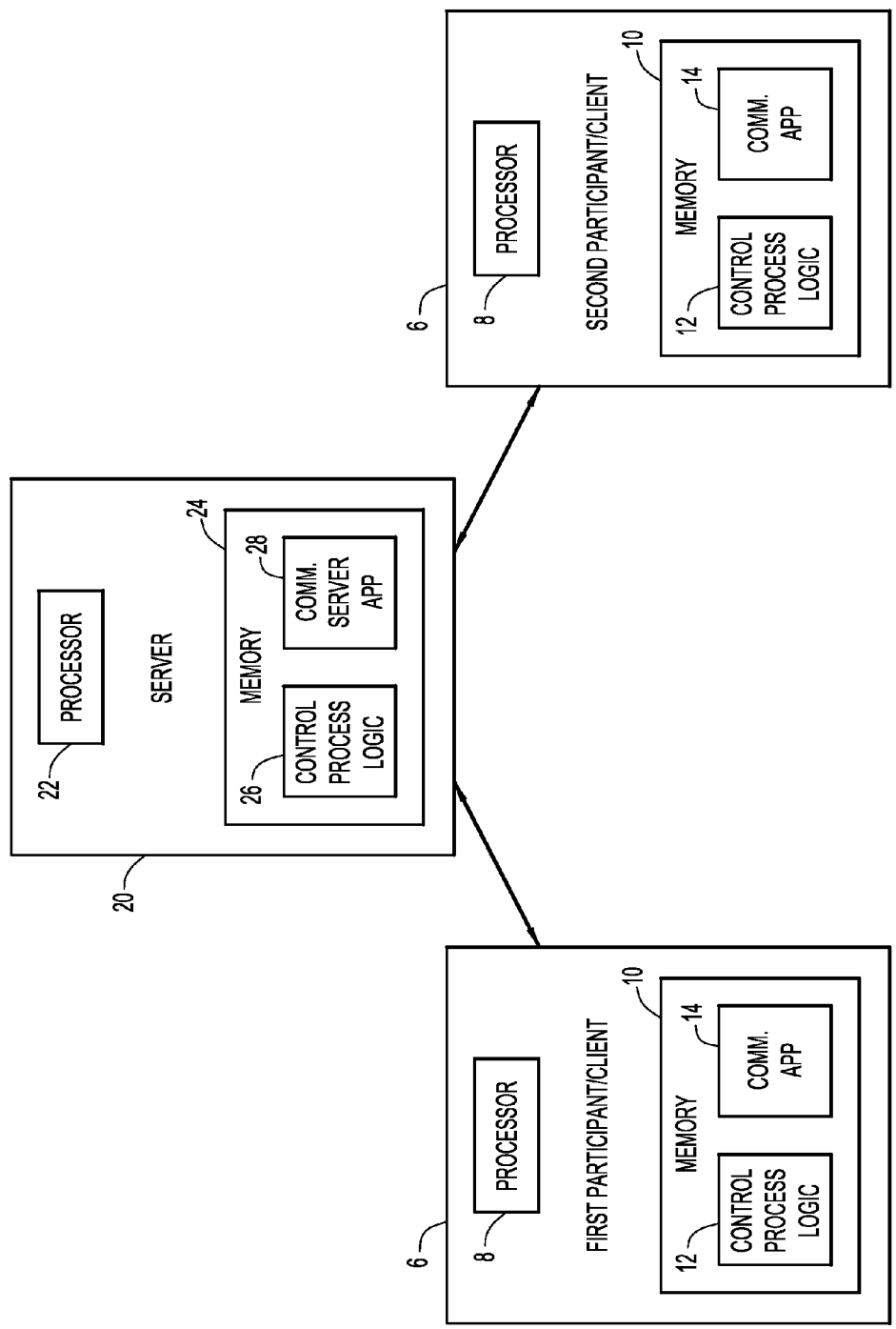
FIG. 2 a schematic block diagram of an example participant/client device configured to engage in different forms of communications with other participant/client devices utilizing a server that facilitates the communications over the system depicted in FIG. 1.

An example embodiment of a system by which two or more participant/client devices 6 engage in an electronic communication session with each other is depicted in FIG. 2. In particular, a first participant/client device 6 engages in a communication session with a second participant/client device 6 via a network server 20. Each client device 6 comprises a suitable computing device including a processor 8 and a memory 10. The server 20 also comprises a suitable computing device including a processor 22 and a memory 24. It is further understood that each computing device (client device or server) further includes a suitable network interface unit (as previously described) and input and output peripheral or other devices (e.g., a keyboard or keypad, an LCD or other suitable display, a mouse or touch pad, a microphone and/or camera/video recorder for audio/video input, a speaker unit or other audio output device, etc.) that facilitate input of data to and output of data from the computing device, where the input and output devices can be separate from or integrated with the computing device. Each processor 8, 22 can comprise a microprocessor that executes control process logic instructions 12, 26 stored within memory 12, 22 of the client device 6 or server 20, where the control process logic instructions include operational instructions and software applications stored within memory 10, 24 (e.g., instant messaging applications, email applications, audio and/or video web conferencing applications and/or any other client communication applications).

In particular, the memory 10 of each client device 6 includes a communication application 14 that comprises one or more software applications to facilitate different types of electronic communications between each client device 6 and one or more other client devices 6 via the server 20, including providing suitable graphical user interfaces for facilitating various operating functions for the client devices 6 during such communications. The memory 24 of the server 20 includes a communication server application 28 that comprises one or more software applications that facilitate establishing different types of communications between client devices 6 that access the server 20, including different operating functions associated with such communications.

Figure 3:
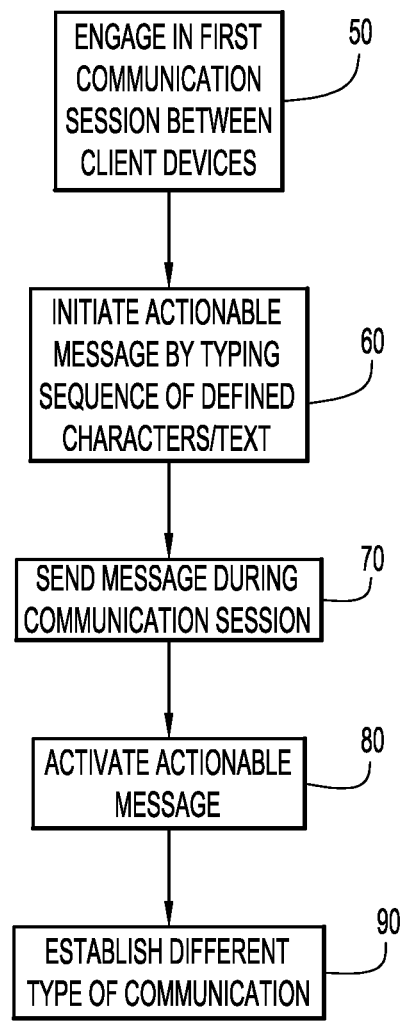
FIG. 3 is a flow chart depicting an example process for changing from one form of electronic communication to another utilizing the techniques described herein.

The processors 8, 28 of the client devices 6 and server 20 perform operations in accordance with the steps set forth in the flow chart of FIG. 3. The memories 10, 24 can comprise read only memory (ROM), random access memory (RAM), magnetic disk storage media devices, optical storage media devices, flash memory devices, electrical, optical, or other physical/tangible memory storage devices, and any combinations thereof.

Thus, each client device 6 can be any suitable computing device that is configured to engage in different types of electronic communications (e.g., instant messaging communications, email communications, audio and/or video communications including phone calls, webcast, audio/video conferencing, etc.) with other client devices, and the server devices are any suitable computing devices that provide a platform for connecting and facilitating different types of electronic communications between client devices. Some examples of client devices that can be used in system 2 include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. Suitable server devices can also be of any suitable types. The client and server devices can utilize any suitable operating systems (e.g., Android, Windows, Mac OS, Symbian OS, RIM Blackberry OS, Linux, etc.) to facilitate operation, use and interaction of the client devices with other client devices via one or more servers over the network.

As previously described, each server 20 of the system network 4 can serve the function of handling and transferring different types of electronic communication messages between two or more client devices 6 over the network 4. Each server 20 can also include a memory 20 having suitable memory capacity to store content associated with client communications for each client device 6 (e.g., a log of messages between one client device 6 and another over a particular time period for instant messaging applications, saved email messages and/or other communications that are accessible by corresponding software of the communication application 14 for each client device 6). In addition, the communication server application 28 of each server 20 can be provided with suitable software tools that facilitate features associated with different forms of communications between the client devices 6. For example, a server 20 can host a chat room or other platform for an instant messaging session, a server 20 can host a web cast or other video conferencing communication session, etc.

The communication application 14 of a client device 6 provides a further feature of allowing a participant engaged in a communication session with at least one other participant of another client device 6 (such as the first and second participant/client devices 6 as shown in FIG. 2) to establish a different and/or more enriched type of electronic communication with the other participant utilizing a simple parameterized actionable communication message conveyed in the ongoing communication session.

There are certain types of tools that are known for initiating a different form of communication session within another form of communication session. Some examples are providing a hyperlink for a web cast meeting within an email or an instant message, providing an email address within an instant message or other communication medium to facilitate generation of an email to such email address, providing XMPP Ad-Hoc Commands (XEP-0050) that can be used for negotiating and signaling conversation escalations between client endpoints, providing plugin tools for browsers and office suites that scan text in applications for occurrences of telephone numbers that allow a user to initiate a call from within these applications, etc. While such tools can be useful for arranging a type of communication session within another type of communication session or application, they are typically not easy to set up by the sender (i.e., the initiator of the requested communication session). Since they are not relatively easy to set up, a participant often just decides to remain in the same form of communication rather than take the steps necessary to establish the other type of communication.

The parameterized actionable communication message that can be established by a client device 6 within system 2, utilizing its communication application 14, provides an easy mechanism for switching from one form of communication to another. For example, in the context of an instant messaging communication session (or any other text-based communication session, such as an email communication) between two or more client devices 6, a participant associated with one client device 6 can arrange for another form of electronic communication, such as a web meeting, between the other participants by typing a string or sequence of defined characters/text that initiates the set up of the electronic communication and also sends a textual request which renders in the form of an image or icon to all participants of the instant messaging communication to attend the other form of communication session. The other participant/electronic devices 6 receive the icon in their instant message communication, and by a simple click on the icon such participant/electronic devices 6 can initiate the other electronic form of communication utilizing the communication application 14.

The string of defined character/text sequences that is typed by the initiating participant in the instant messaging forum that establishes another form of communication is also referred to herein as a "communicon". The communicon can include a string or sequence of defined characters/text such as ":callme" (e.g., to set up a phone call or other audio communication between participants) or ":meetme" (e.g., to set up an audio and/or video web conference between participants), or any other defined set of characters/text. When the text sequence is typed, the communication application 14 of the client device 6 recognizes the text sequence and can replace the text sequence with an icon (e.g., an icon of a telephone to represent a phone call, or a suitable icon to represent a web conference). Thus, a communicon is converted from the defined text sequence to an icon in a similar or analogous manner as the conversion of a defined series of characters/text that typically form an emoticon (e.g., a series of characters, such as ":" followed by ")" in an email or other text based applications can be identified by the email or other text/document software such that the software forms an emoticon, such as an icon in the form of a smiley face, "☺"). However, the communicon may further include a parameterized feature in that other information is associated with the communicon that may be used as input to establish another form of communication. For example, a pull-down menu or other suitable form of parameterized data fields can appear with the icon of the communicon when the defined series of characters/text is input by the initiating participant, where the parameterized feature allows the initiating participant to enter data associated with the communicon (e.g., a phone number or web meeting subject or agenda). Alternatively, the parameterized data can be previously assigned to a particular communicon by a participant. For example, a communicon set-up configuration can be implemented by the communication application 14 of a client device 6, where a participant can enter the parameterized information such as a phone number or a web meeting location as well as any other information for different communicons, such that, when the communicon is initiated for use by the participant typing in the defined text sequence, the parameterized data is already provided for the communicon. The sending participant's information (e.g., phone number, email address, etc.) may also already be known by the client device 6 (e.g., based upon an initial configuration of the device for the user of that device), such that the communicon obtains the parameterized data without any additional action required by the sending participant.

When a participant, via a client device 6, creates and sends a communicon to the client device 6 of a receiving participant, the receiving participant receives the communicon (i.e., in the form of an actionable icon) in the communication session in which the participants are currently engaged (e.g., an instant messaging session or an email session). The communication application 14 of the receiving client device 6 acts to initiate or enable the communicon at the receiving participant end by the receiving participant clicking (e.g., executing a single click) on the communicon.

So, for example, in the scenario of a sending participant requesting participants of an instant messaging session to escalate to a more content enriched form of communication, such as a phone call or video conferencing session, the sending participant generates an appropriate communicon (e.g., by typing a defined series of characters/text, such as ":callme" or ":meetme") via the communication application 14 at the sending client device 6. Upon sending the message including the communicon to all of the recipient participants (or to a select group of invited recipient participants) in the instant messaging communication session, each recipient participant/client device 6 receives the message including the communicon (e.g., in the form of an icon that represents the form of communication requested). A recipient participant can simply click on the communicon, which results in the communication application 14 of the recipient client device 6 initiating or activating the different type of communication session at the recipient client device 6. The communication server application 28 of each server 20 associated with the instant messaging session and different type of communication session further facilitates the new form of communication session (e.g., by hosting a web conference meeting or a conference call between all invited participants) upon activation of the communicon by receiving participants.

In an example embodiment, a ":callme" communicon is defined such that, when sent from a sending participant in an instant message communication session, one or more receiving participants receives an icon (such as an image of a phone) in-line with a text message from the sending participant. When a receiving participant clicks on the icon, this results in the receiving participant calling the sending participant to establish an audio communication (e.g., phone call). The communicon can be parameterized to include a phone number (or suitable address information to establish an audio communication) for the sending participant, where the sending participant has added a phone number associated with the ":callme" communicon. For example, the sending participant may have a default phone number that is always used for the ":callme" communicon, or the sending participant may add the phone number as a parameter to the ":callme" communicon as it is being initiated in the instant messaging communication, e.g., via a drop down or pull down menu that appears when the communicon is initiated by the sending participant (thus enabling the sending participant to utilize different phone numbers for the communicon at any given time). Alternatively, in the event the sending participant has not provided a phone number or the communication application 14 of the receiving participant is configured to determine a phone number to associate with the sending participant, when the communicon is activated/clicked on the receiving participant side, the communication application 14 of the receiving participant/client device 6 can retrieve a phone number from a known source on the receiving participant side (e.g., a phone number from a directory stored in memory 10 of the client device 6 that is associated with the sending participant, where the sending participant is identified based upon the instant message platform in which the participants engage in the instant message communication session).

The communication application 14 of a client device 6 can also be configured to allow a sending participant to include the phone number as a parameter with the string of defined characters/text that initiates a communicon to further streamline the initiation of the communication for establishing the new form of communication. For example, the sending participant could enter a parameterized string of text such as ":callme(123456789)", where this text initiates the phone call communication request and also provides the phone number of the sending participant (i.e., the number sequence within the parentheses after ":callme"). This communicon could, for example, represent a conference-call bridge or possibly an alternative number (i.e., a number that is not a default phone number for the sending participant). As previously noted, if the sending participant does not provide any number, the communication application 14 of each receiving participant/client device 6 can utilize a default or preferred number for the sending participant (which is obtained from a suitable contacts list or other data source associated with the client device 6).

In addition to the ":callme" communicon (which establishes an audio communication/phone call as an alternative form of communication between participants), other forms of communicons including, without limitation, ":meetme" and ":share", are also possible. In particular, a ":meetme" communicon can operate in a similar manner as a ":callme" communicon to establish a video conferencing/web meeting communication session (rather than a phone call), where the URL (uniform resource locator) address or other suitable web meeting address location as well as any other suitable information (e.g., login/password information) are provided by the sending participant as parameters of the ":meetme" communicon. In a similar manner as the ":callme" communicon, when a receiving participant clicks on the ":meetme" communicon in the text message (e.g., in an instant message or email), the communication application 14 of the receiving participant/client device 6 connects the receiving participant with the web meeting/video conferencing communication session at the host address (e.g., held by a server 20 in the system 2).

For the ":meetme" communicon, the client device 6 of the sending participant establishes or sets up a host meeting room at a suitable server 20 and based upon the parameterized information associated with the ":meetme" communicon (such as meeting agenda, subject etc. . . . ). In a similar manner as the ":callme" communicon, the parameterized information associated with a ":meetme" communicon can be provided by the participant at the instance the string or sequence of defined text is typed (e.g., via a pull down menu in which data fields can be entered) or, alternatively, at some initial set-up process in which the communicon is defined by the sending participant utilizing the communication application 14 of the client device 6 at the sending end.

A ":share" communicon can be implemented within a communication session such as a videoconference/web meeting to modify or enrich the meeting, e.g., by allowing a participant to share screen content with others in the communication session. For example, a sending participant can initiate and send a ":share" communicon to other participants, which either requests a participant to share screen content at their client device 6 or offers sharing of content by the sending participant with others being sent the communicon. By clicking on the icon associated with the ":share" communicon at the receiving end, the receiving participant/client device 6 can be configured to view shared content by another participant (e.g., the participant sending the ":share" communicon or some other participant) or to share its own content with other participants of the communication session.

Another example of a form of communicon that can be implemented utilizing the communication application 14 of a client device 6 is a voicemail communicon, ":voicemail". In this example, the ":voicemail" communicon facilitates the sending of voicemail and/or video messages from a sending participant to other participants. When the participant types this text sequence, the communication application 14 of the participant's client device 6 presents the participant with a graphical user interface (GUI) that allows the participant to record an audio and/or video message to other selected participants of the communication session. In particular, as previously noted, a client device 6 can include input devices, such as a microphone and camera or video recorder (implemented as separate peripheral devices or integrated as part of the client device), that are configured to record audio and video images of the participant. The participant can record an audio and/or video message using the GUI and then send the message to selected participants of the communication session. The ":voicemail" communicon can further be used at any given time at a client device 6. In other words, a user of the client device 6 need not be engaged in a communication session to initiate and send a ":voicemail" communicon to other client devices 6.

A recorded message that is generated using the ":voicemail" communicon can be transmitted to recipient client devices 6 either via existing file transfer functionality (e.g., using a file transfer protocol such as XEP-0096) or via integration with a suitable voice mail support platform provided by a server 20 of the system 2. A client device 6 at the receiving end of a ":voicemail" communicon, utilizing its communication application 14, receives the communicon in the form of an icon representing that a message is available from someone (where the communicon or message associated with the communicon can also provide information regarding the sender of the communicon). In the event the ":voicemail" communicon is generated during an ongoing communication session, such as an instant messaging session, the receiving participant receives the icon in-line with a text message from the sending participant. Alternatively, when there is no on-going communication session, a receiving party or receiver can receive the ":voicemail" communicon from the sender via any suitable communication tool, such as a pop-up instant message or in an email communication from the sender or via a TUI phone interface (e.g., providing a message such as "Press 1 to hear your voicemail"). Upon clicking upon the icon, the communication application 14 of the receiver's client device 6 provides a playback GUI that allows the receiver to play, pause, adjust volume, etc. of the message when viewing it.

Another example of a communicon is a ":createvote" communicon, in which the communicon can be generated by a participant in a communication session and sent to other participants to poll the participants regarding a particular question or topic associated with the communication session (thus providing a collaborative decision making process within the communication session). When the sending participant initiates this communicon by typing ":createvote", a GUI (e.g., a pop up menu or other interface) can be implemented in which the participant enters a question to be voted upon (e.g., "Should we continue with this plan?"). Receiving participants in the communication session that receive the icon for this communicon can click on it to see the question and be provided with the option of voting (e.g., choosing a "YES", "NO" or "UNDECIDED" option). When enough receiving participants have voted, the sending participant may receive the results of the poll in a message within the same communication session (e.g., within an instant messaging conversation) or within another form of communication (e.g., via an email). In addition, the results of the poll can also be shared with the other participants. The parameterized information associated with the ":createvote" communicon can be set to provide different formats in which polling information is provided to the sending participant and also shared with other participants. For example, voting information can be maintained confidential (in which the polling information simply provides a number of total votes for each possible response category) or provide information regarding which participant voted and how they voted.

Still another example of a communicon is a ":contact" communicon that allows a participant of a communication session to send contact information of another person (e.g., another participant engaged in the communication session) to one or more receiving participants during the on-going communication session. For example, in an instant messaging session, one participant may present a query such as "Who should I contact about this project?" A sending participant may type ":contact" to initiated this communicon, where the communication application 14 of the sender's client device 6 generates a suitable interface that allows the sending participant to select information (e.g., in the form of an electronic business card or vCard) about persons in a directory of the participant (e.g., a "buddy list" or an address directory) and send the information about the person or persons to the querying participant within the same communication session or via a different type of communication. On the receiving end, the receiving participant can receive an icon (e.g., within the same communication session) that, when clicked upon, provides the information about the person or persons that are capable of assisting with the query. The communication application 14 for the client device 6 of a receiving participant can further provide options such as an option to add the information to any suitable directory of the receiving participant, and an option to initiate a communication session with such person or persons (e.g., sending an email or instant message, initiating a phone call, etc.) based on the parameterized information which was sent.

Many other forms of communicons are also possible, e.g., with different character sequences and/or different functionalities, where each communicon can be implemented/activated by a single click on the icon associated with the communicon by each participant receiving the communicon (as well as by the sending participant). As previously noted, the communication application 14 of a client device 6 can include a suitable initialization process in the form of a graphical user interface (GUI) or any other suitable software tool that allows the participant at the device 6 to set up and/or define new communicons and also input parameterized information associated with the communicons.

In the event a receiving participant/client device 6 does not have a communication application 14 or other software that supports interpretation of a communicon sent by a sending participant, the system 2 can be configured to provide for a graceful degradation of service between such client devices, where a parameter is passed with the communicon that can be automatically represented as a URI (uniform resource indicator). The protocol of the URI can be configured to depend upon the type of communicon that is being sent from the sending participant to the receiving participant that does not support the communicon. In an example embodiment, a ":callme" communicon may be shown at the non-supporting participant end as ":callme(tel: 123456789)" (e.g., where the phone number is displayed so that the receiving participant can initiate the phone call), while a ":meetme" communicon might be shown at the non-supporting participant end as ":meetme(http://www.meetingserver.com/id=1234) (e.g., showing the URL address that the receiving participant can use to access the web meeting). For receiving participants having client devices 6 that support communicons, such information can be stripped out on interpretation of the communicon by the communication application 14 of the client device 6 at the receiving end. However, for client devices 6 that do not support communicons but do support commonly used URI protocols, the client device 6 can present the receiving participant with a clickable link that will launch the escalated communication medium using any other suitable software application that is registered with the client device operating system for the given protocol (e.g., a telephony application, a web browser application, etc.).

In another example embodiment of changing to a different form of communication between participants using a communicon, the communication applications 14 of client devices 6 (and also corresponding communication server applications 28 of one or more servers 20 of the system 2) can be configured to facilitate initiation, configuration and launching of a different type or form of communication session (e.g., a phone call or web meeting) within an ongoing communication session (e.g., an instant messaging session or an email session) utilizing a communicon (i.e., typing of a series or string of defined characters/text) without the need of a receiving participant initiating the different communication session with a single click on an icon. In particular, the sending participant can set up the different communication session by typing the communicon (e.g., ":call" or ":meet"), resulting in the sending participant/client device 6 initializing, configuring, transmitting and launching the different communication session. For example, in a ":call" scenario, the initiation of the ":call" communicon at the sending participant end results in a phone call/audio communication session being initiated by the sending participant/client device 6 calling selected one or more participants in the current, on-going communication session. For a ":meet" scenario, the sending participant/client device 6 sets up a web meeting room at the host server 20 and transmits to each receiving participant/client device 6 the information for joining the web meeting, where a receiving participant/client device 6 can display a suitable pop-up message or other form of notification alerting the receiving participant of the request to join in the web meeting. Thus, a communicon configured in this format allows a command line-like interface in which the sending/initiating participant can easily set up and implement (execute) the different form of communication immediately (i.e., the different communication session is created and launched at the sending participant end, instead of being created and launched upon a receiving participant clicking on an icon associated with the communicon at the receiving participant end).

Other forms of parameterized actionable messages within a text based communication session are also possible in addition to communicons (which result in a change to a different communication session or an upgrade to a more enriched or enhanced communication session). In particular, parameterized actionable messages referred to herein as "acticons" can be configured to implement (execute) an action in response to a participant/user at a client device 6 typing in a defined sequence of characters/text. Some non-limiting examples of acticons that can be implemented/executed include a ":bookroom" acticon, in which a sender of this acticon sets up a physical meeting or conference room by querying a server 20 that is configured to obtain information regarding locations, times and dates in which certain conference rooms are available. The server 20 can further be provided with information regarding invited participants in order to determine the best geographical location for a meeting based upon known locations of the participants. The server 20 then sends out an invitation to the invited participants via any suitable communication medium (e.g., via email) with suggested times, locations, meeting rooms, as well as any other information (e.g., topic of meeting, information regarding requester of meeting, etc.). The server 20 can also provide the information regarding availability and location of possible meeting rooms/sites to the sender of the ":bookroom" acticon so that the sender can then book a meeting room that is suitable for all invited participants.

Another example of an acticon may be a ":helpdesk" acticon that generates a client support ticket at a server 20 which can automatically initiate a communication between the sender of the ":helpdesk" acticon and a support agent associated with the client device 6 generating this acticon.

Some additional possible acticons include those that facilitate automated control mechanisms for electronically controlled devices disposed at one or more geographic locations. For example, a ":settemp" acticon may facilitate the setting of a thermostat temperature of an HVAC system that provides thermal temperature control within one or more rooms associated with a client device 6 (e.g., including the room in which the client device 6 is located). When the ":settemp" text is typed by a user of the client device 6 within a suitable software tool of the communication application 14, the user may be prompted to enter a temperature. Alternatively, the acticon can executed with the user typing the temperature to be set along with the acticon text (e.g., ":settemp(22 C)", which indicates the temperature should be set to 22° C.). The server 20 associated with the client device 6 includes a communication server application that controls a corresponding thermostat for the HVAC system to set the thermostat to the temperature input utilizing the ":settemp" acticon.

Many other types of electronic devices can also be controlled in a similar manner within a selected geographical location based upon defined acticons that are identified and supported by the communication application 14 of the client device 6 and also the communication server application 28 of the server 20 that is connected with such devices. For example, ":blinds(up)" and ":blinds(down)" acticons can be defined to correspondingly control window blinds within a room in which a client device 6 is located (where the client device 6 or server 20 associated with the client device 6 is connected in some manner with automated controllers that adjust the height or level of the blinds within the room). In another example, an acticon such as ":lightson", ":lightsoff", ":lightsdim", etc. can be configured to control room lighting (e.g., by turning lights on or off, or controlling the light levels within the room associated with and controlled by the client device 6).

Figure 4:
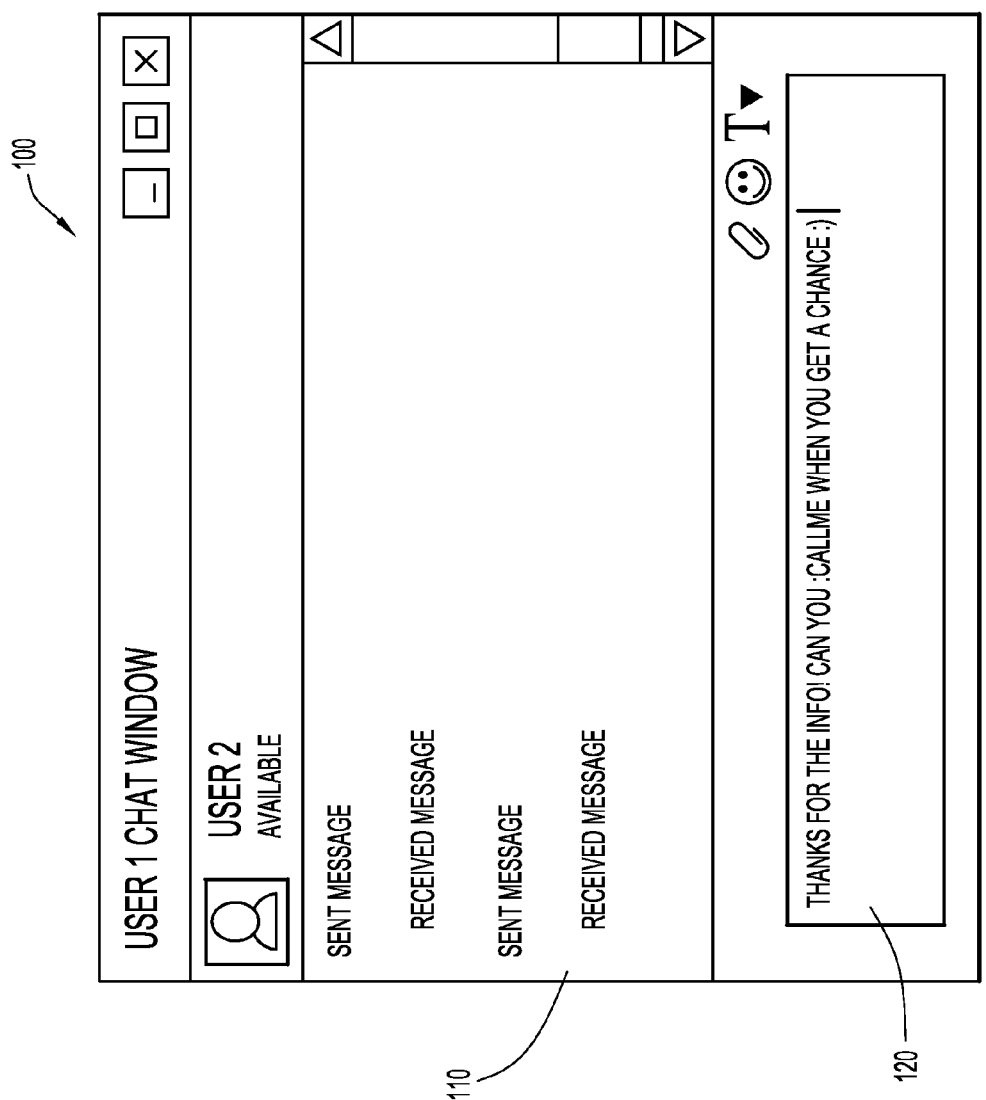
FIGS. 4-7 are graphical user interface images demonstrating an example of how an actionable communication message is utilized within one form of communication between participants to facilitate another form of communication between participants in accordance with the example process depicted in the flow chart of FIG. 2.

Operation of the system 2 as depicted in FIGS. 1 and 2 is now described with reference to the flowchart of FIG. 3 and also the GUI images of FIGS. 4-7. The GUI images provide an example scenario in which an instant messaging session is engaged in by at least two participants, and in which a ":callme" communicon is implemented/executed. At 50, a first communication session (an instant messaging session) is engaged in between at least a first participant/client device 6 and a second participant/client device 6, where the first communication session is hosted by a server 20 (utilizing the server's communication server application 28). During the first communication session, the first participant/client device 6 desires to switch to a more intimate or enriched form of communication with the second participant/client device 6. The first participant/client device 6 proceeds to initiate an actionable message in the form of a ":callme" communicon at 60. The GUI image 100 in FIG. 4 depicts the instant messaging session at the first client device 6 that is ongoing between the first and second participants, where the message box or window 110 represents the on-going messages exchanged between the participants and the message composing window 120 represents the input field in which the participant at the first client device 6 composes a message to be sent to other participants of the instant messaging session. As depicted in window 120, the participant of the first client device 6 composes a message including the series or sequence of defined characters ":callme" to be sent to the other participants (including the participant of the second client device 6).

Figure 5:
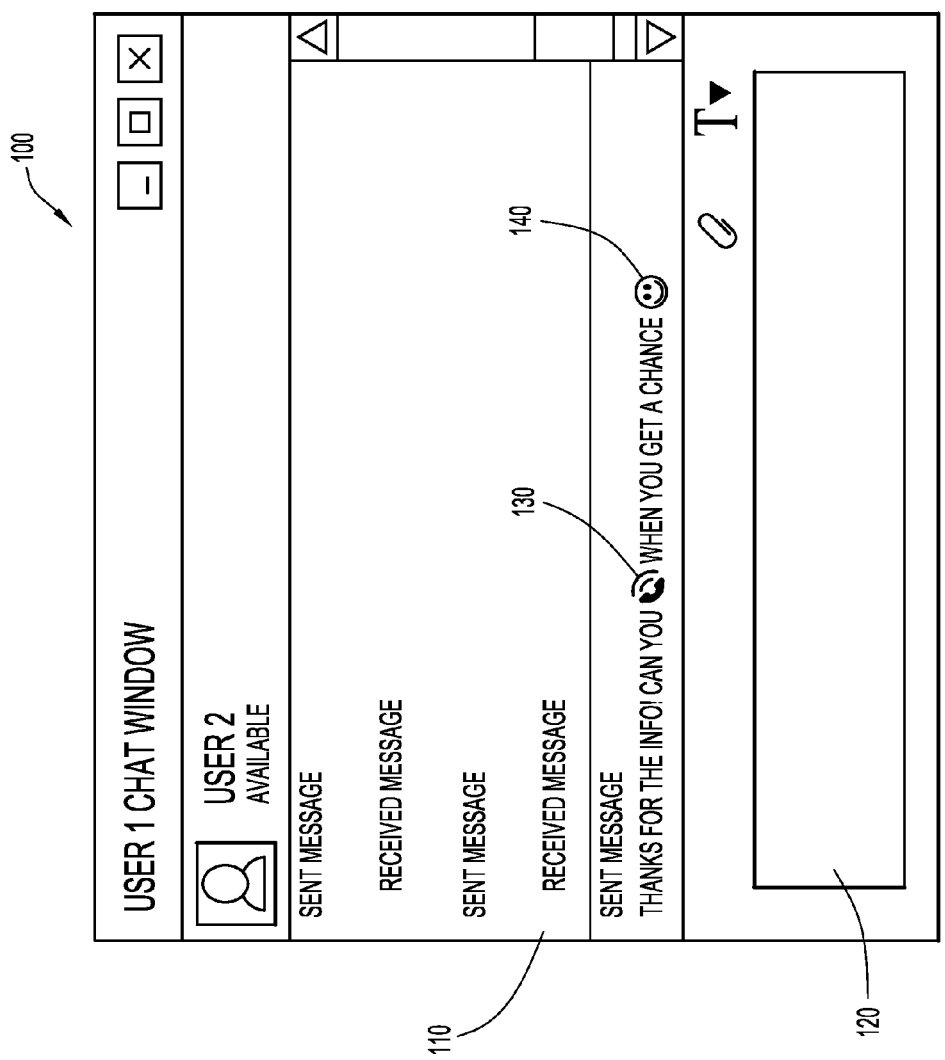

The communication application 14 of the first client device 6 identifies the sequence of defined characters ":callme" in the message being composed by the first/sending participant and converts this text to the icon associated with this communicon in response to sending the message from the first client device 6 to the second client device 6. As depicted in FIG. 5, the ":callme" text from box 120 of the GUI 100 has been converted to a phone icon upon sending the message (shown as 130 in FIG. 5). In addition, an emoticon (shown as 140 in FIG. 5) also appears based upon a sequence of identified text from the typed message (i.e., the sequence of characters ":" and ")" has been converted to the smiley face emoticon ☺). In this scenario, the parameterized information associated with the ":callme" communicon (e.g., the phone number of the participant for the first client device 6) has already been assigned by the participant generating this communicon, such that no pop up or pull down menu or other GUI window appears to prompt the participant to provide such parameterized information. However, in other scenarios (e.g., depending upon whether such information has been previously provided, or by adjusting control settings for the communicon, e.g., in scenarios in which a participant must always enter such information upon typing the defined sequence of characters that generates the communicon), a prompt would appear requesting the participant to provide necessary parameterized information associated with the communicon prior to this communicon being sent in a message to other participants.

Figure 6:
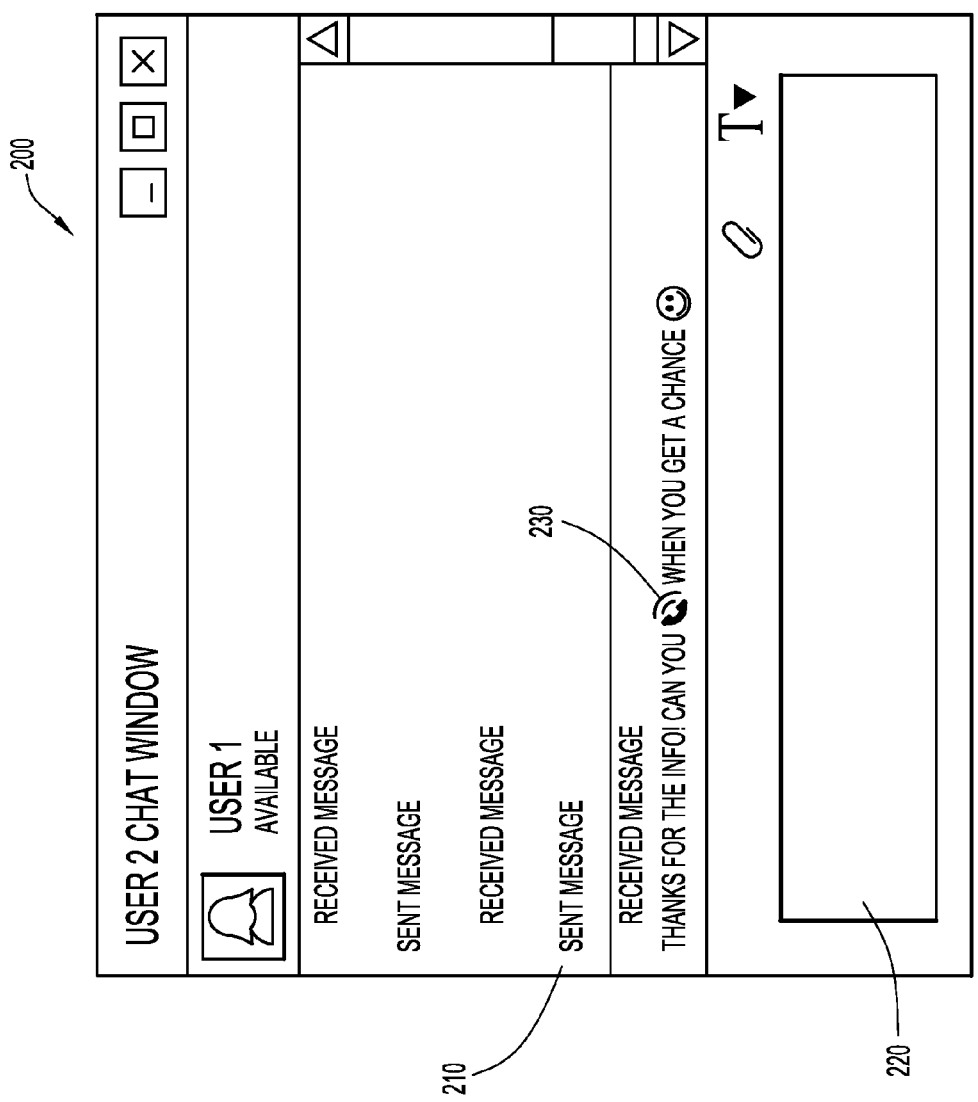
Figure 7:
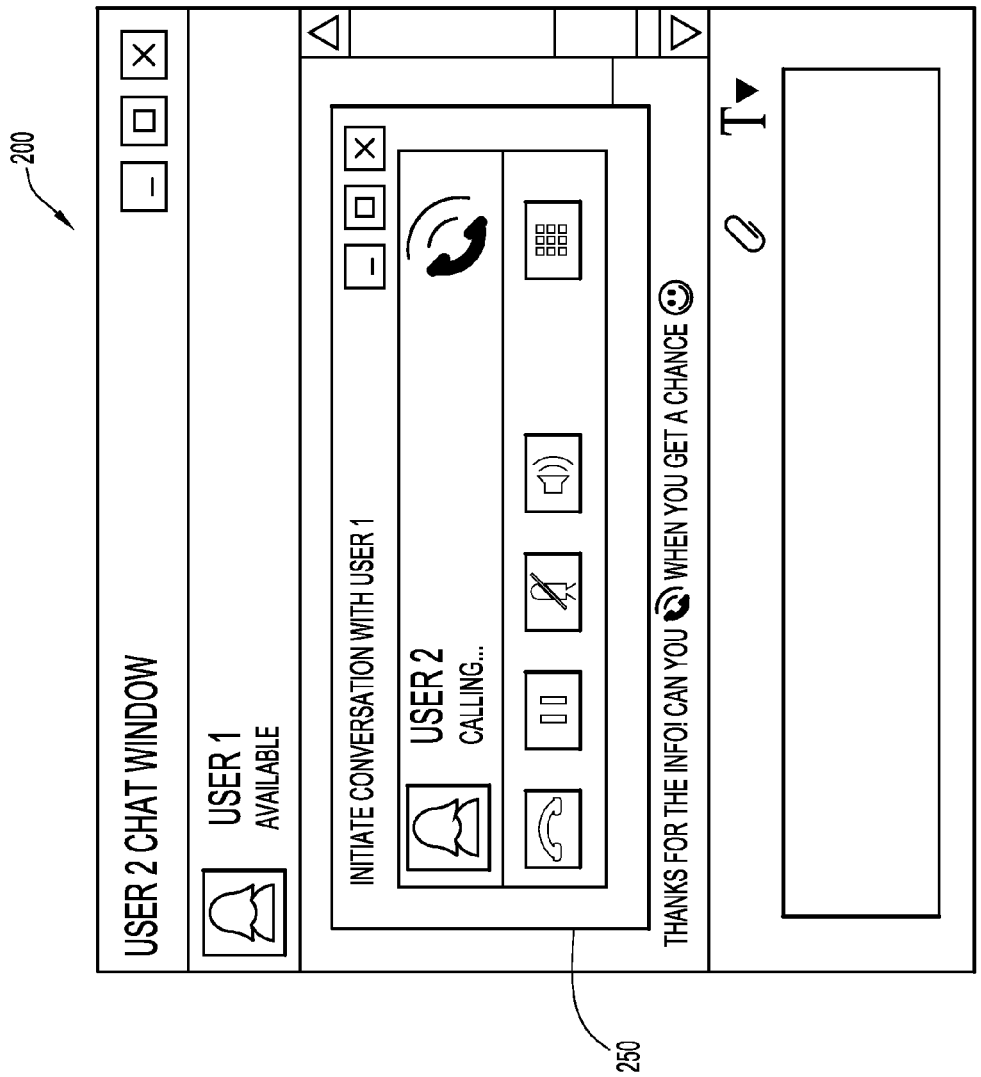

At 70, the message with communicon is sent from the first client device 6 to the second client device 6 via the network including server 20. The second client device 6 receives the message as shown in the GUI image 200 of FIG. 6, where the message includes the communicon 230. The communicon 230 can also include the parameterized information associated with the communicon (e.g., including the sending participant's phone number for a ":callme" communicon). Alternatively, as previously noted, the parameterized information can be obtained from an information directory stored at the second client device 6 of the receiving participant, where the information directory includes relevant information about the sending participant (e.g., the sending participant's phone number). The GUI of the second client device 6 (as depicted in FIG. 6) is similar to the GUI of the first client device and includes a message window 210 and a message composing window 220. At 80, the second client device 6 activates the actionable message (the ":callme" communicon) by clicking on the communicon 230 within the display box 210 of the GUI. This results in a different type of communication being established between the participants of the on-going communication session at 90.

In particular, as depicted in FIG. 6, in response to clicking the ":callme" communicon within the instant messaging GUI of the second/receiving client device 6, the communication application 14 of the second/receiving client device 6 initiates a phone call or audio communication with the first client device 6, as indicated by the window 250 displayed within the GUI image 200. The phone call or audio communication can be implemented/executed utilizing any suitable software tools and supporting server platforms that support such a communication medium, where such software tools are integrated as part of the communication applications 14 for each client device 6 as well as the communication server application 28 for each server 20 associated with the network connection between the client devices 6.

Considering further the example embodiment in which an instant messaging communication session between the first and second client devices is changed to a phone call or audio communication via implementation/execution of a ":callme" communicon, another different type or form of communication may further be desired. For example, during the phone call or audio communication session, the participants may decide that a physical meeting is necessary. One of the participants (e.g., either client device 6) can choose to set up a physical meeting by initiating, e.g., a ":bookroom" acticon in a manner as previously described. This provides for a further escalation or upgrading of the communication session in a relatively easy manner.

Thus, the previous example depicts how participants in an instant messaging communication session can modify the conversation to a different type of communication session (a phone call or audio conversation) via a simple typing of a defined character sequence by one participant to generate a communicon and a simple activation of the communicon by another/receiving participant. As previously described, other communicons or acticons can act in a similar or slightly modified manner, depending upon the specifics and desired functionality of the actionable message.

The actionable messages, such as communicons, can be used in a system as described herein to indicate communicative intent in a manner analogous to how emoticons indicate emotional intent. The actionable messages provide an automatic mechanism (e.g., by typing a defined sequence of characters and/or single clicking on an icon) of escalating from one communication medium to an enhanced and/or new communication medium with present conversation participants preserved or to provide an action with the relevant parameterized information associated with the actionable message transmitted to generate the desired action.

Thus, the present invention facilitates an instant message (or other form of communication session) participant to type simple character sequences that are interpreted by client/computing devices to initiate the required communication session and then include the required parameters with the original string in the transmitted message. When interpreted on a recipient client/computing device, an activatable (e.g., clickable) image or icon is provided which allows the recipient to escalate with one click from, e.g., a text-based instant message conversation to an additional communication medium without requiring either party to leave the instant message text interface or to explicitly create, configure or separately share the details of the new communication session. This provides a simple command line-like user experience to enhance or escalate a particular conversation between participants.

The use of actionable messages according to the methods and systems described above eliminates the requirement of manual user steps for separately creating, configuring and advertising the escalated conversation session. In addition, upon an actionable message such as a communicon being interpreted and rendered, the receiving participants receive rich and intuitive visual indicators (e.g., instead of just a text hyperlink or other information associated with establishing another form of communication). The systems and methods described herein further facilitate a graceful downgrade for clients that cannot interpret or render the actionable message, which is different from "out of band" schemes (such as XMPP AdHoc commands) where an unsupported client will not react or notify the user of the escalation attempt in any way. Further, when utilizing communicons as previously described, all user interactions can be completely inline in the text of a message. This serves to streamline user experience, since no external interface elements are required. This is particularly useful in domains where user interface space is constrained (e.g., no available space for side-by-side windows, which limits multiple application use), and interaction modalities are limited (e.g., when operating within a PDA, smart phone or other mobile electronic device with limited display window operating space), which would otherwise make it very difficult To readily change from type of communication medium to another.

The above description is intended by way of example only.

What is claimed is:

1. A method comprising:
   in response to a predefined sequence of characters being input within a first communication session at a first computing device, generating a predefined actionable icon that is displayed within the first communication session for at least one of the first computing device and a second computing device, wherein the predefined actionable icon comprises an actionable message;
   initiating the actionable message within the first communication session at the first computing device that is associated with the generated icon, wherein the initiating the actionable message includes obtaining contact information for users of the first and second computing devices to enable initiation of a second communication session between the users; and
   in response to the user of at least one of the first computing device and the second computing device selecting the icon, executing an action associated with the initiated actionable message utilizing the contact information, wherein the action results in initiation of the second communication session, the first communication session comprises an email session or an instant messaging session, and the second communication session comprises an audio communication and/or a video communication between two or more users via computing devices.

2. The method of claim 1, further comprising:
   facilitating input of at least one parameter including information associated with the action to be executed in relation to the actionable message.

3. The method of claim 1, further comprising:
engaging in the first communication session including at least the first computing device and the second computing device;
wherein the actionable message is initiated at the first computing device and sent to the second computing device via the first communication session, and the icon is generated at the second computing device in response to receiving the actionable message from the first computing device.

4. The method of claim 1, wherein the contact information comprises a phone number associated with the first computing device.

5. The method of claim 1, wherein the contact information comprises information that enables a video conference meeting between the first and second computing devices.

6. An apparatus comprising:
a memory configured to store instructions including a communication application; and
a processor configured to execute and control operations of the communication application so as to:
in response to a predefined sequence of characters being input within a first communication session at a first computing device, generate a predefined actionable icon that is displayed within the first communication session for at least one of the first computing device and a second computing device, wherein the predefined actionable icon comprises an actionable message;
initiate the actionable message within the first communication session at the first computing device that is associated with the generated icon, wherein the initiating the actionable message includes obtaining contact information for users of the first and second computing devices to enable initiation of a second communication session between the users; and
in response to the user of at least one of the first computing device and the second computing device selecting the icon, execute an action associated with the initiated actionable message utilizing the contact information, wherein the action results in initiation of the second communication session, the first communication session comprises an email session or an instant messaging session, and the second communication session comprises an audio communication and/or a video communication between two or more users via computing devices.

7. The apparatus of claim 6, wherein the apparatus comprises the first computing device and further comprises a network interface unit that is configured to enable communication with the second computing device over a network for the first and second communication sessions.

8. The apparatus of claim 7, wherein the processor is further configured to:
transmit the initiated actionable message to the second computing device during the first communication session.

9. The apparatus of claim 7, wherein the processor is further configured to:
receive an actionable message from the second computing device during the first communication session, wherein the actionable message comprises an icon that is displayed by the apparatus; and
in response to the actionable message being activated at the apparatus by selection of the icon at the apparatus, execute an action associated with the activated actionable message.

10. One or more computer readable storage devices encoded with software comprising computer executable instructions and when the software is executed operable to:
in response to a predefined sequence of characters being input within a first communication session at a first computing device, generate a predefined actionable icon that is displayed within the first communication session for at least one of the first computing device and a second computing device, wherein the predefined actionable icon comprises an actionable message;
initiate the actionable message within the first communication session at the first computing device that is associated with the generated icon, wherein initiation of the actionable message includes obtaining contact information for users of the first and second computing devices to enable initiation of a second communication session between the users; and
in response to the user of at least one of the first computing device and the second computing device selecting the icon, execute an action associated with the initiated actionable message utilizing the contact information, wherein the action results in initiation of the second communication session, the first communication session comprises an email session or an instant messaging session, and the second communication session comprises an audio communication and/or a video communication between two or more users via computing devices.

11. The one or more computer readable storage devices of claim 10, and further comprising instructions that are operable to:
engage in the first communication session including at least the first computing device and the second computing device;
wherein the actionable message is initiated at the first computing device and sent to the second computing device via the first communication session, and the icon is generated at the second computing device in response to receiving the actionable message from the first computing device.

12. The one or more computer readable storage devices of claim 11, wherein the instructions operable to execute the action comprise instructions operable to execute the action by a user of the first computing device.

13. The one or more computer readable storage devices of claim 10, wherein the contact information comprises a phone number associated with the first computing device.

14. The one or more computer readable storage devices of claim 10, wherein the contact information comprises information that enables a video conference meeting between the first and second computing devices.

* * * * *